United States Patent
Angell et al.

(10) Patent No.: US 8,700,764 B2
(45) Date of Patent: Apr. 15, 2014

(54) ROUTING INCOMING MESSAGES AT A BLADE CHASSIS

(75) Inventors: Robert L. Angell, Salt Lake City, UT (US); David W. Cosby, Raleigh, NC (US); Richard J. Dalle-Molle, Rochester, MN (US); Robert R. Friedlander, Southbury, CT (US); James R. Kraemer, Santa Fe, NM (US); Edward S. Suffern, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 12/568,539

(22) Filed: Sep. 28, 2009

(65) Prior Publication Data

US 2011/0078250 A1    Mar. 31, 2011

(51) Int. Cl.
*G06F 15/173*    (2006.01)

(52) U.S. Cl.
USPC .......................................... 709/224; 709/206

(58) Field of Classification Search
USPC .................................. 709/206, 238; 209/224
See application file for complete search history.

(56) References Cited

U.S. PATENT DOCUMENTS

| | | | | |
|---|---|---|---|---|
| 5,524,254 | A * | 6/1996 | Morgan et al. | 709/245 |
| 5,568,525 | A * | 10/1996 | de Nijs et al. | 375/356 |
| 5,613,096 | A * | 3/1997 | Danknick | 709/236 |
| 7,426,602 | B2 | 9/2008 | Stewart et al. | |
| 7,675,922 | B2 * | 3/2010 | Magendanz et al. | 370/401 |
| 8,149,867 | B2 * | 4/2012 | Karaoguz | 370/465 |
| 8,225,307 | B2 * | 7/2012 | Baker et al. | 717/174 |
| 2005/0251567 | A1 * | 11/2005 | Ballew et al. | 709/223 |
| 2006/0129724 | A1 * | 6/2006 | Kostadinov | 710/106 |
| 2006/0168070 | A1 | 7/2006 | Thompson et al. | |
| 2007/0067481 | A1 | 3/2007 | Sharma et al. | |
| 2007/0280223 | A1 * | 12/2007 | Pan et al. | 370/360 |
| 2008/0126110 | A1 | 5/2008 | Haeberle et al. | |
| 2008/0259555 | A1 * | 10/2008 | Bechtolsheim et al. | 361/686 |
| 2008/0275975 | A1 | 11/2008 | Pandey et al. | |
| 2008/0320136 | A1 | 12/2008 | Holt et al. | |
| 2009/0063696 | A1 | 3/2009 | Wang et al. | |
| 2009/0077208 | A1 | 3/2009 | Nguyen et al. | |
| 2009/0125459 | A1 | 5/2009 | Norton et al. | |

* cited by examiner

*Primary Examiner* — John MacIlwinen
(74) *Attorney, Agent, or Firm* — John R. Pivnichny; Law Office of Jim Boice

(57) ABSTRACT

A pass-through module in a blade chassis receives an incoming message that utilizes a transmission protocol from one of multiple transmission protocols. The pass-through module determines which of the multiple transmission protocols is used by the incoming message by: comparing a physical component of the transmission protocol used by the incoming message with known physical components of the multiple transmission protocols, and, if necessary, comparing a logical component of the transmission protocol used by the incoming message with known logical components of the multiple transmission protocols. The incoming message is then routed to an optimal blade that is specifically adapted to process messages that utilize the transmission protocol used by the incoming message.

12 Claims, 5 Drawing Sheets

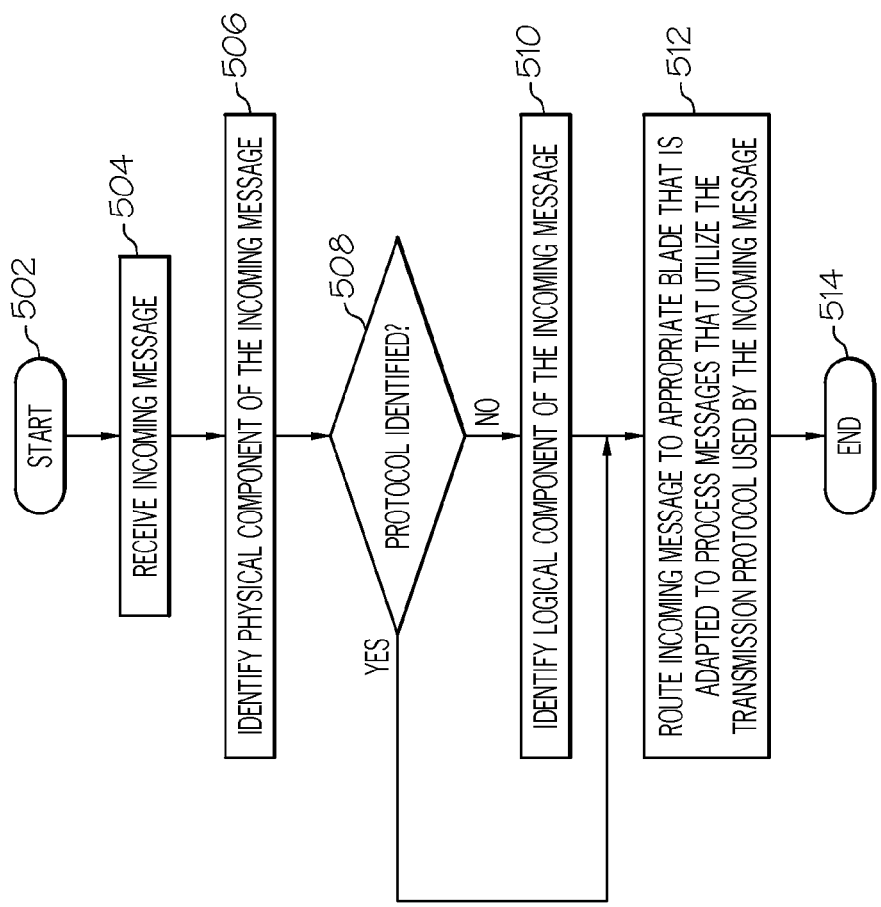

ROUTING INCOMING MESSAGES AT A BLADE CHASSIS

BACKGROUND

The present disclosure relates to the field of computers, and specifically to messages between computers. Still more particularly, the present disclosure relates to routing incoming messages to optimal blades in a blade chassis.

BRIEF SUMMARY

A pass-through module in a blade chassis receives an incoming message that utilizes a transmission protocol from one of multiple transmission protocols. The pass-through module determines which of the multiple transmission protocols is used by the incoming message by comparing a physical component of the transmission protocol used by the incoming message with known physical components of the multiple transmission protocols. If necessary, a logical component of the transmission protocol used by the incoming message is compared with known logical components of the multiple transmission protocols. The incoming message is then routed to an optimal blade that is specifically adapted to process messages that utilize the transmission protocol used by the incoming message.

BRIEF DESCRIPTION OF THE SEVERAL VIEWS OF THE DRAWINGS

FIG. 5 is a high-level flow-chart of exemplary steps processed by a computer to route incoming messages to blades in a blade chassis.

DETAILED DESCRIPTION

Figure 1:
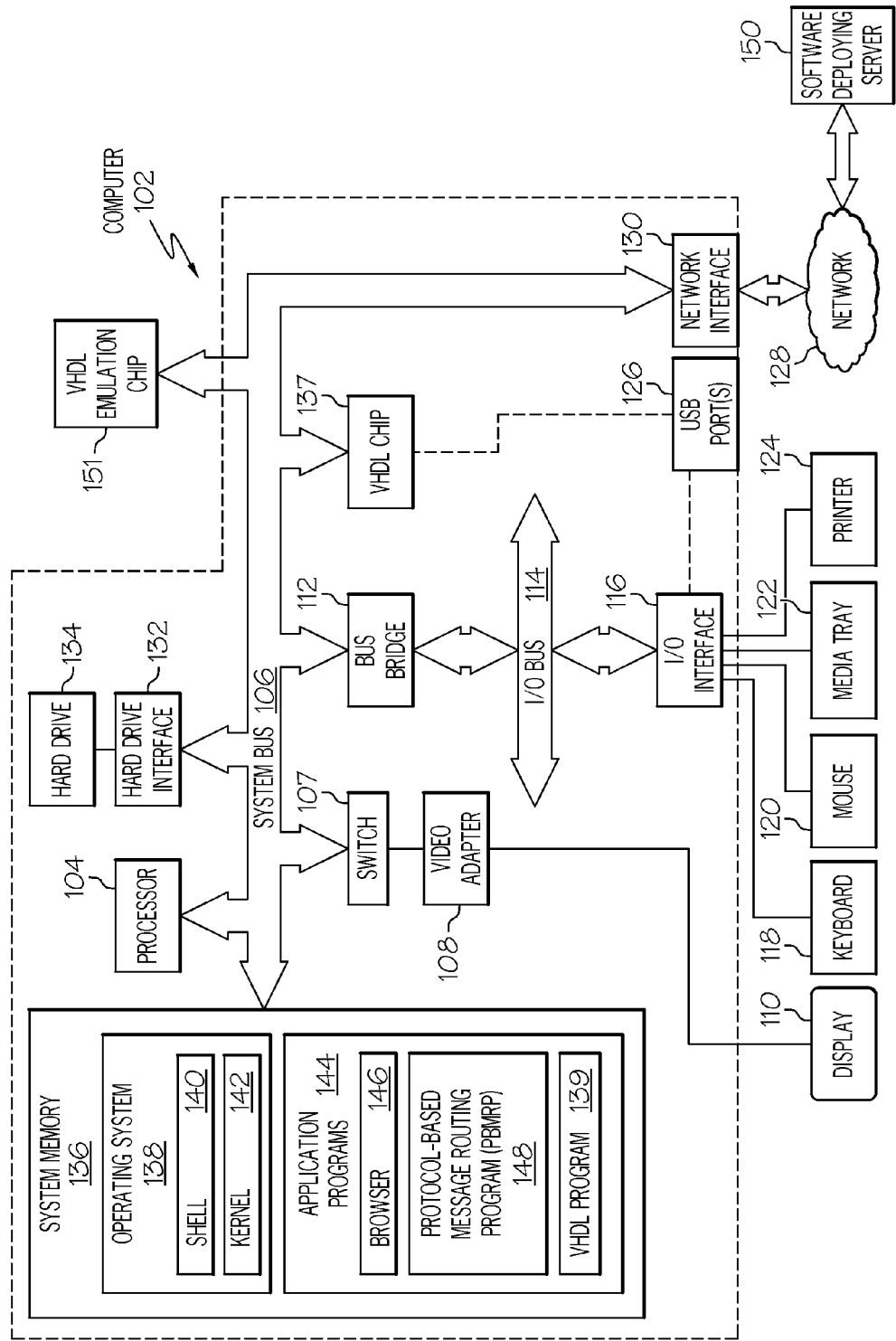
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150 and/or blades 204a-n illustrated in FIG. 2.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., protocol-based message routing program—PBMRP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a protocol-based message routing program (PBMRP) 148. PBMRP 148 includes code for implementing the processes described below, including those described in FIGS. 2-5. In one embodiment, computer 102 is able to download PBMRP 148 from software deploying server 150, including in an on-demand basis. Note further that, in one embodiment of the present invention, software deploying server 150 performs all of the functions associated with the present invention (including execution of PBMRP 148), thus freeing computer 102 from having to use its own internal computing resources to execute PBMRP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from PBMRP 148 causes VHDL program 139 to configure VHDL chip 137, which may be an FPGA, ASIC, etc.

In another embodiment of the present invention, execution of instructions from PBMRP 148 results in a utilization of VHDL program 139 to program a VHDL emulation chip 151. VHDL emulation chip 151 may incorporate a similar architecture as described above for VHDL chip 137. Once PBMRP 148 and VHDL program 139 program VHDL emulation chip 151, VHDL emulation chip 151 performs, as hardware, some or all functions described by one or more executions of some or all of the instructions found in PBMRP 148. That is, the VHDL emulation chip 151 is a hardware emulation of some or all of the software instructions found in PBMRP 148. In one embodiment, VHDL emulation chip 151 is a programmable read only memory (PROM) that, once burned in accordance with instructions from PBMRP 148 and VHDL program 139, is permanently transformed into a new circuitry that performs the functions needed to perform the process described below in FIGS. 2-5.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
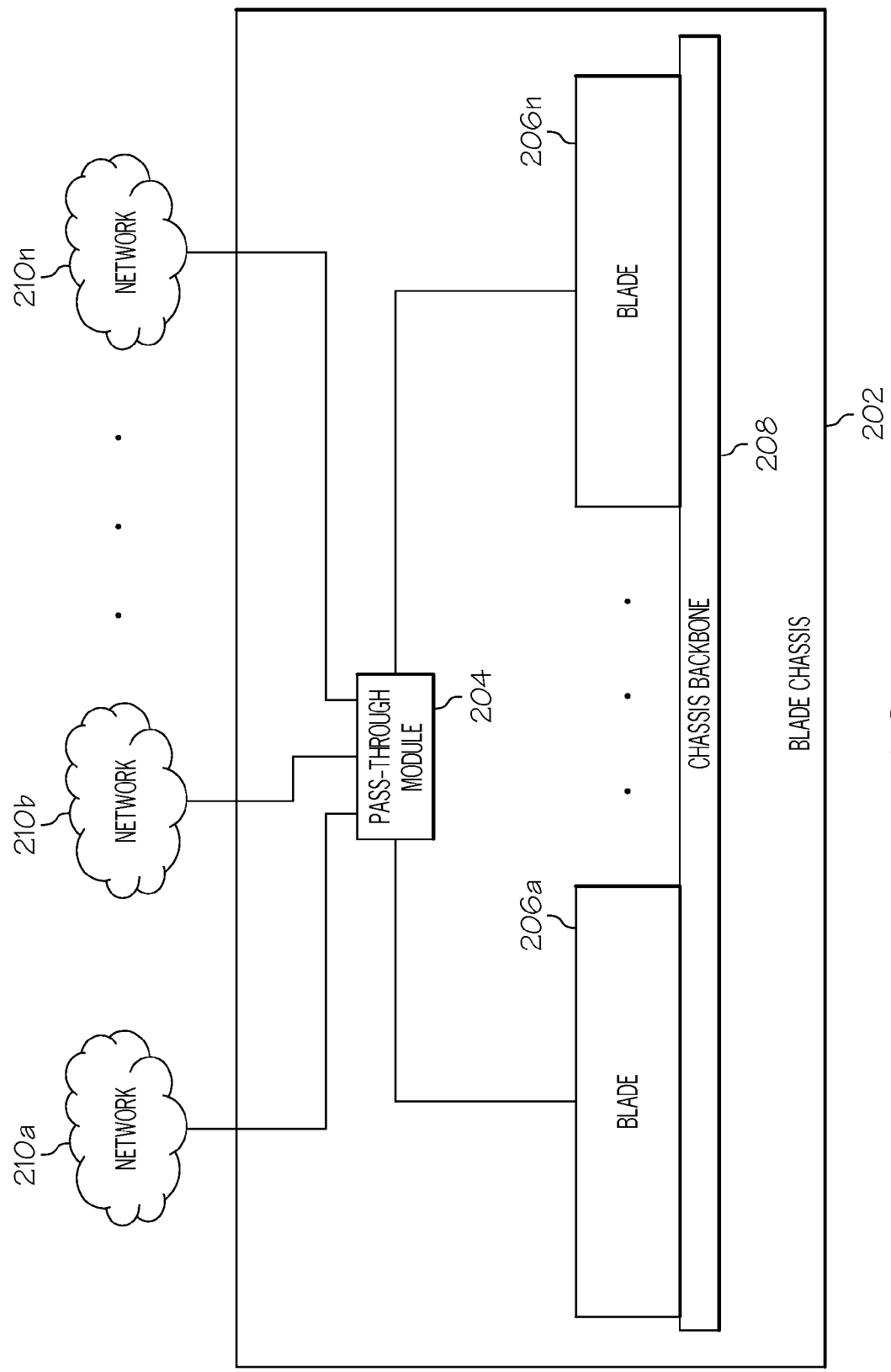
FIG. 2 illustrates an exemplary blade chassis in which the present disclosure may be implemented.

With reference now to FIG. 2, an exemplary blade chassis 202, in accordance with one embodiment of the present invention, is presented. In a traditional blade input/output (I/O) architecture, I/O protocol selection is performed via daughter cards to enable Ethernet, Fibre channel, Infiniband, Myrinet, etc. traffic to be routed to protocol-specific blades. That is, a separate I/O interface card is dedicated to each protocol used by a particular type of network. However, this requires hardwired cards that are difficult to manually (non-dynamically) reconfigure. These cards reduce the scalability and flexibility of the system, and tie up valuable I/O card space. The present disclosure provides a more dynamic system for routing incoming messages to protocol-specific blades through the use of a pass-through module 204. Note that pass-through module 204 may also have I/O functionality, or this I/O functionality may be in a dedicated I/O card (not shown) within the blade chassis 202. In either embodiment, pass-through module 204 is coupled to multiple blades 206*a-n* (where "n" is an integer), which are coupled to a chassis backbone 208. Pass-through module 204, which is protocol independent, recognizes and matches protocols, in a manner described below, in order to enable connections only on a matching optimal blade from blade 206*a-n*.

Thus, consider networks 210*a-n* (where "n" is an integer). Each of the networks 210*a-n* supports devices (e.g., servers, storage devices, printers, other resources) that utilize a particular transmission protocol (e.g., Ethernet, Fibre channel 1x, Fibre Channel 2x, Fibre channel 4x, Infiniband 1x, Myrinet). Thus, network 210*a* may support/utilize only the Ethernet protocol, network 210*b* may support/utilize only the Infiniband protocol, etc. In an exemplary manner described below, pass-through module 204 is able to identify which protocol is used by a particular network, and then pass messages/data/instructions to an optimal blade that supports that protocol.

Figure 3:
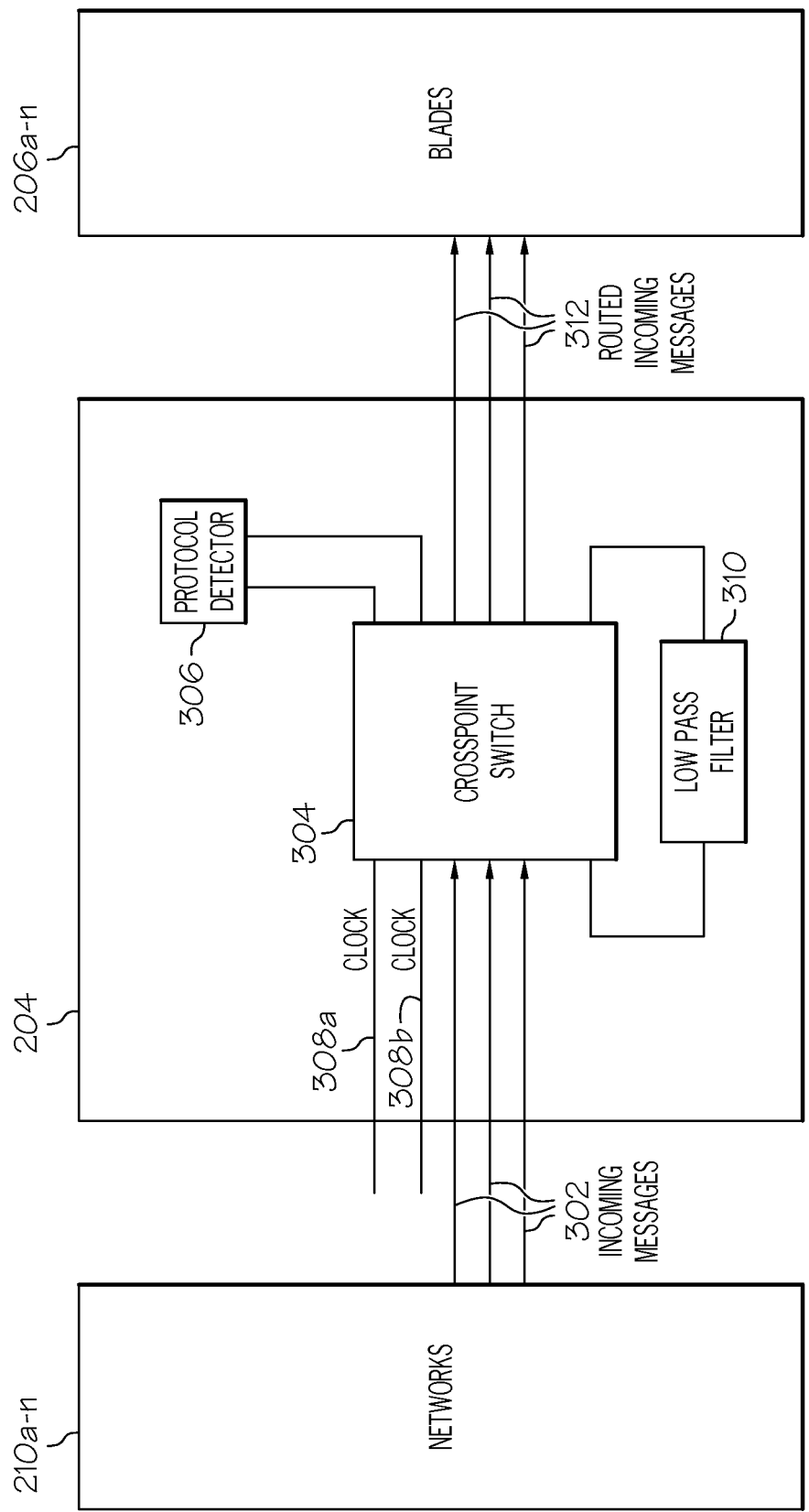
FIG. 3 depicts exemplary detail of a pass-through module illustrated in FIG. 2.

With reference now to FIG. 3, additional detail of the pass-through module 204 illustrated in FIG. 2 is presented. Various incoming messages 302 are received by the pass-through module 204 from the networks 210*a-n*. One way of quickly determining what protocol is being used by the incoming messages 302 is to look at the clock speed used by the incoming message. Thus, a crosspoint switch 304 uses a protocol detector 306 to physically compare known clocks 308*a-b* with the clock speed of the incoming message. This clock speed is identifiable by the temporal distance between bits in the incoming messages 302. Alternatively, open system interconnection (OSI) Layer 1 (physical layer) information in the incoming message 302 packets can be examined to identify clock speed, as well as other physical layer elements, to identify what protocol is used by each of the incoming messages 302. This OSI Layer 1 includes layout of pins, voltages, cable specifications, etc. Thus, by detecting what voltage level is used by an incoming message, that incoming message's protocol can be narrowed down to one or more protocols that use that voltage level.

Figure 4:
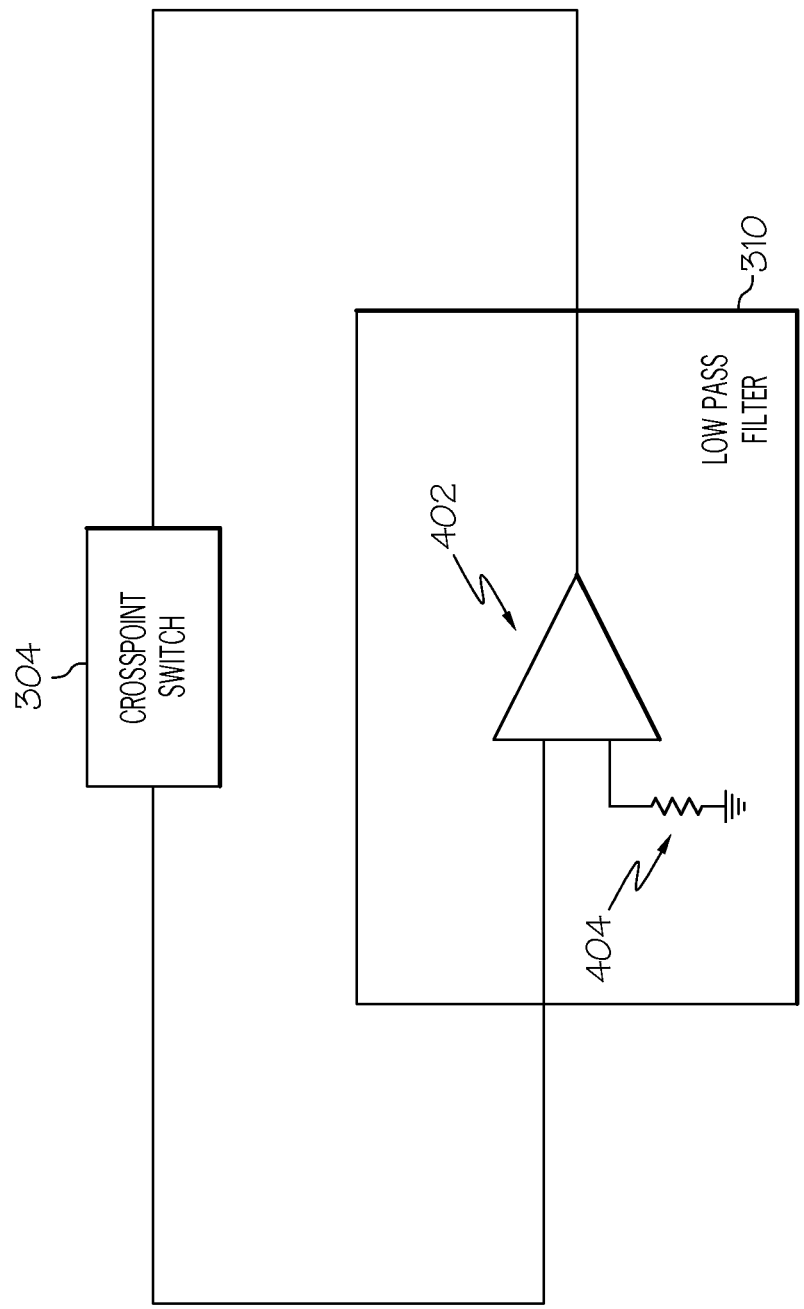
FIG. 4 illustrates exemplary detail of a low pass filter depicted in FIG. 3.

However, multiple incoming messages 302 arriving at the crosspoint switch 304 at the same time causes cross-talk and noise, thus making detection of clock speed, voltages, and other physical parameters difficult to assess. Thus, a low pass filter 310 is coupled to the crosspoint switch 304 to reduce such "noise." An exemplary low pass filter 310 is shown in FIG. 4. As depicted, low pass filter 310 can be a differential amplifier 402 (e.g., an op-amp) that has one input tied to ground by a resister 404. Thus low pass filter 310 "takes out" any stray noise found in the crosspoint switch 304 as caused by the arrival of multiple incoming messages 302.

Returning to FIG. 3, if the OSI Layer 1 physical information is enough to identify the protocol used by a particular incoming message, then each of the incoming messages 302 are routed, as routed incoming messages 312, by the crosspoint switch 304 to an optimal blade from blades 206*a-n*.

Each optimal blade is a blade that is specifically adapted to use the same transmissions protocol as the incoming message that is routed to that blade. This specific adaptation can be through clock matching (e.g., the optimal blade has an internal bus whose speed matches the clock speed used by the incoming message), bandwidth matching (e.g., the optimal blade has an I/O port that is tuned to process messages of that particular bandwidth speed), processing power alignment (e.g., the optimal blade has a processor unit that has enough processing power to handle the incoming message, without having excess and thus wasted processing power), memory availability (e.g., the optimal blade has enough local cache and system memory to handle the speed at which the incoming message is arriving), etc.

However, if the OSI Layer 1 physical information is insufficient to identify the protocol used by the particular incoming message (i.e., multiple protocols use the same physical parameters), then OSI Layer 2 and/or Layer 3 information in the unidentified incoming message is examined. OSI Layer 2 (data link layer) information provides physical addressing information, including error correction, flow control, bit arrangement of frames, etc. OSI Layer 3 (network layer) information provides path determination and logical addressing used in transferring variable length data packets. This network layer provides logical routing information, fragmentation and reassembly information used when sending data in multiple packets, router instructions, etc.

Each transmission protocol uses a unique combination of Layer 2 and Layer 3 information. By matching the information in Layer 2 and Layer 3 of the incoming messages 302, the protocol being used can be identified, and the message then routed by the crosspoint switch 304 to an optimal blade (i.e., blade using that protocol) from the blades 206*a-n*. Note that in one embodiment, crosspoint switch 304 can be composed of essential elements of computer 102 shown in FIG. 1. These essential elements include, but are not limited to, processor 104 and PBMRP 148 (which includes a look-up table of what Layer 1-3 parameters are used by specific transmission protocol), as well as network interface 130.

With reference now to FIG. 5, a high-level flow-chart of exemplary steps processed by a computer to route incoming messages to blades in a blade chassis is presented. After initiator block 502, an incoming message is received at a blade chassis (block 504). In a manner described above, the physical component of the incoming message is identified (block 506). This physical component can be physically detected using hardware (e.g., detecting the clock speed, bandwidth, voltage levels, etc.) of the incoming message, or the physical component can be part of the OSI physical Layer 1 information found in the header of the incoming message. If identifying the physical component is enough to identify the protocol used in the incoming message (query block 508), then the incoming message is routed to the optimal blade that is configured to handle this protocol (block 512). If the physical component is not enough (query block 508), then the logical component (i.e., OSI Layer ⅔ information) of the incoming message is compared to a table of OSI Layer ⅔ parameters used by known transmission protocols (block 510), and the incoming message is then routed to the optimal blade (block 512). The process ends at terminator block 514.

As shown above in exemplary manner, the presently described method and system properly detect an assortment of protocols (Ethernet, Fibre channel 1x, Fibre Channel 2x, Fibre channel 4x, Infiniband 1x, Myrinet, etc.) on the blade center side ("inward") and external system ("outward") side of a pass-through switch module, which in one embodiment is a daughter card. That is, the pass-through module 204 described above identifies what protocol is used by the incoming message ("outward"), and then matches that incoming message to the optimal blade ("inward"). This design more reliably detects and matches protocols and makes input to output connections only when the protocols used by the incoming message and used by the optimal blade match.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer system comprising:
   a central processing unit (CPU), a computer readable memory, and a computer readable storage medium;
   first program instructions to receive an incoming message at a blade chassis, wherein the incoming message utilizes a transmission protocol from one of multiple transmission protocols, wherein a logical component of the transmission protocol of the incoming message uses a unique combination of Layer 2 and Layer 3 information;
   second program instructions to determine which of the multiple transmission protocols is used by the incoming message by:
      comparing a physical component of the transmission protocol used by the incoming message with known physical components of the multiple transmission protocols, wherein the physical component of the transmission protocol used by the incoming message is a specific voltage level, and wherein the pass-through module physically measures the specific voltage level used by the incoming message to identify the transmission protocol used by the incoming message, and
      in response to the comparing of the physical components of the transmission protocol used by the incoming message failing to identify which of the multiple transmission protocols is being used by the incoming message, comparing the Layer 2 and Layer 3 information of the incoming message with Layer 2 and Layer 3 information from known transmission protocols to identify the transmission protocol used by the incoming message; and
   third program instructions to route the incoming message to an optimal blade in the blade chassis, wherein the optimal blade is specifically adapted to process messages that utilize the transmission protocol used by the incoming message, and wherein
   said first, second, and third program instructions are stored on said computer readable storage medium, wherein said first, second, and third program instructions are executed by said CPU via said computer readable memory.

2. The computer system of claim 1, wherein the physical components of the transmission protocols are physically detected by a pass-through module as a voltage level used by the incoming message.

3. The computer system of claim 1, wherein the physical components of the transmission protocols are physically detected by a pass-through module as a clock speed used by the incoming message.

4. The computer system of claim 1, wherein the physical components of the transmission protocols are found in OSI Layer 1 information located in the incoming message.

5. A computer program product for routing an incoming message to an optimal blade in a blade chassis, the computer program product comprising:
   a non-transitory computer readable storage medium having stored and encoded thereon: first program instructions to receive an incoming message at a blade chassis, wherein the incoming message utilizes a transmission protocol from one of multiple transmission protocols, wherein a logical component of the transmission protocol of the incoming message uses a unique combination of Layer 2 and Layer 3 information;

second program instructions to determine which of the multiple transmission protocols is used by the incoming message by:
  comparing a physical component of the transmission protocol used by the incoming message with known physical components of the multiple transmission protocols, wherein the physical component of the transmission protocol used by the incoming message is a specific voltage level, and wherein the pass-through module physically measures the specific voltage level used by the incoming message to identify the transmission protocol used by the incoming message, and
  in response to the comparing of the physical components of the transmission protocol used by the incoming message failing to identify which of the multiple transmission protocols is being used by the incoming message, comparing the Layer 2 and Layer 3 information of the incoming message with Layer 2 and Layer 3 information from known transmission protocols to identify the transmission protocol used by the incoming message; and
third program instructions to route the incoming message to an optimal blade in the blade chassis, wherein the optimal blade is specifically adapted to process messages that utilize the transmission protocol used by the incoming message.

6. The computer program product of claim 5, wherein the physical components of the transmission protocols are physically detected by a pass-through module as a voltage level used by the incoming message.

7. The computer program product of claim 5, wherein the physical components of the transmission protocols are physically detected by a pass-through module as a clock speed used by the incoming message.

8. The computer program product of claim 5, wherein the physical components of the transmission protocols are found in OSI Layer 1 information located in the incoming message.

9. A method for routing an incoming message to an optimal blade in a blade chassis, the method comprising:
  receiving an incoming message at a blade chassis, wherein the incoming message utilizes a transmission protocol from one of multiple transmission protocols, wherein a logical component of the transmission protocol of the incoming message uses a unique combination of Layer 2 and Layer 3 information;
determining, by one or more processors, which of the multiple transmission protocols is used by the incoming message by:
  comparing a physical component of the transmission protocol used by the incoming message with known physical components of the multiple transmission protocols, wherein the physical component of the transmission protocol used by the incoming message is a specific voltage level, and wherein the pass-through module physically measures the specific voltage level used by the incoming message to identify the transmission protocol used by the incoming message, and
  in response to the comparing of the physical components of the transmission protocol used by the incoming message failing to identify which of the multiple transmission protocols is being used by the incoming message, comparing the Layer 2 and Layer 3 information of the incoming message with Layer 2 and Layer 3 information from known transmission protocols to identify the transmission protocol used by the incoming message; and
routing, by one or more processors, the incoming message to an optimal blade in the blade chassis, wherein the optimal blade is specifically adapted to process messages that utilize the transmission protocol used by the incoming message.

10. The method of claim 9, wherein the physical components of the transmission protocols are physically detected by a pass-through module as a voltage level used by the incoming message.

11. The method of claim 9, wherein the physical components of the transmission protocols are physically detected by a pass-through module as a clock speed used by the incoming message.

12. The method of claim 9, wherein the physical components of the transmission protocols are found in OSI Layer 1 information located in the incoming message.

* * * * *